US012731619B2

(12) United States Patent
Zembutsu et al.

(10) Patent No.: US 12,731,619 B2
(45) Date of Patent: Sep. 8, 2026

(54) IMAGING DEVICE AND IMAGING SYSTEM

(71) Applicant: Panasonic Intellectual Property Management Co., Ltd., Osaka (JP)

(72) Inventors: Tomoki Zembutsu, Osaka (JP); Takashi Suzuki, Osaka (JP); Takayoshi Shimoda, Osaka (JP); Masahiro Yamada, Osaka (JP); Akira Seto, Osaka (JP); Kenji Arakawa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 53 days.

(21) Appl. No.: 18/814,645

(22) Filed: Aug. 26, 2024

(65) Prior Publication Data

US 2025/0078875 A1 Mar. 6, 2025

(30) Foreign Application Priority Data

Sep. 1, 2023 (JP) ................................ 2023-142283

(51) Int. Cl.

| | |
|---|---|
| ***G11B 27/34*** | (2006.01) |
| ***G10L 19/00*** | (2013.01) |
| ***G11B 20/00*** | (2006.01) |
| ***H04N 19/46*** | (2014.01) |

(52) U.S. Cl.
CPC .............. *G11B 27/34* (2013.01); *G10L 19/00* (2013.01); *G11B 20/00007* (2013.01); *H04N 19/46* (2014.11); *G11B 2020/00014* (2013.01); *G11B 2020/00072* (2013.01)

(58) Field of Classification Search
CPC .............. G11B 27/34; G11B 20/00007; G11B 20/00014; G11B 2020/00072; H04N 19/46; G10L 19/00
See application file for complete search history.

(56) References Cited

U.S. PATENT DOCUMENTS

2006/0104616 A1 * 5/2006 Shellshear ............ G11B 27/10
386/234

FOREIGN PATENT DOCUMENTS

| | | |
|---|---|---|
| JP | 2006-174318 A | 6/2006 |
| JP | 2015-032846 A | 2/2015 |

* cited by examiner

*Primary Examiner* — Girumsew Wendmagegn
(74) *Attorney, Agent, or Firm* — Renner, Otto, Boisselle & Sklar, LLP

(57) ABSTRACT

In an imaging device or an imaging system, it becomes possible to generate a moving image file in which audio and a moving image are synchronized with each other even if moving image capturing is started from the middle of music. Upon receiving an operation input for audio reproduction execution, the imaging device causes an audio decoder to execute an operation, and outputs audio data to a speaker. At this time, a reproduction position in audio coded data is calculated, and reproduction position data is sent to a multiplexer. Upon receiving an operation input for moving image capturing execution, a moving image encoder and the multiplexer are caused to execute operations. The multiplexer multiplexes the reproduction position data to moving image coded data and the audio coded data, to generate a moving image file.

5 Claims, 10 Drawing Sheets

Figure 3:
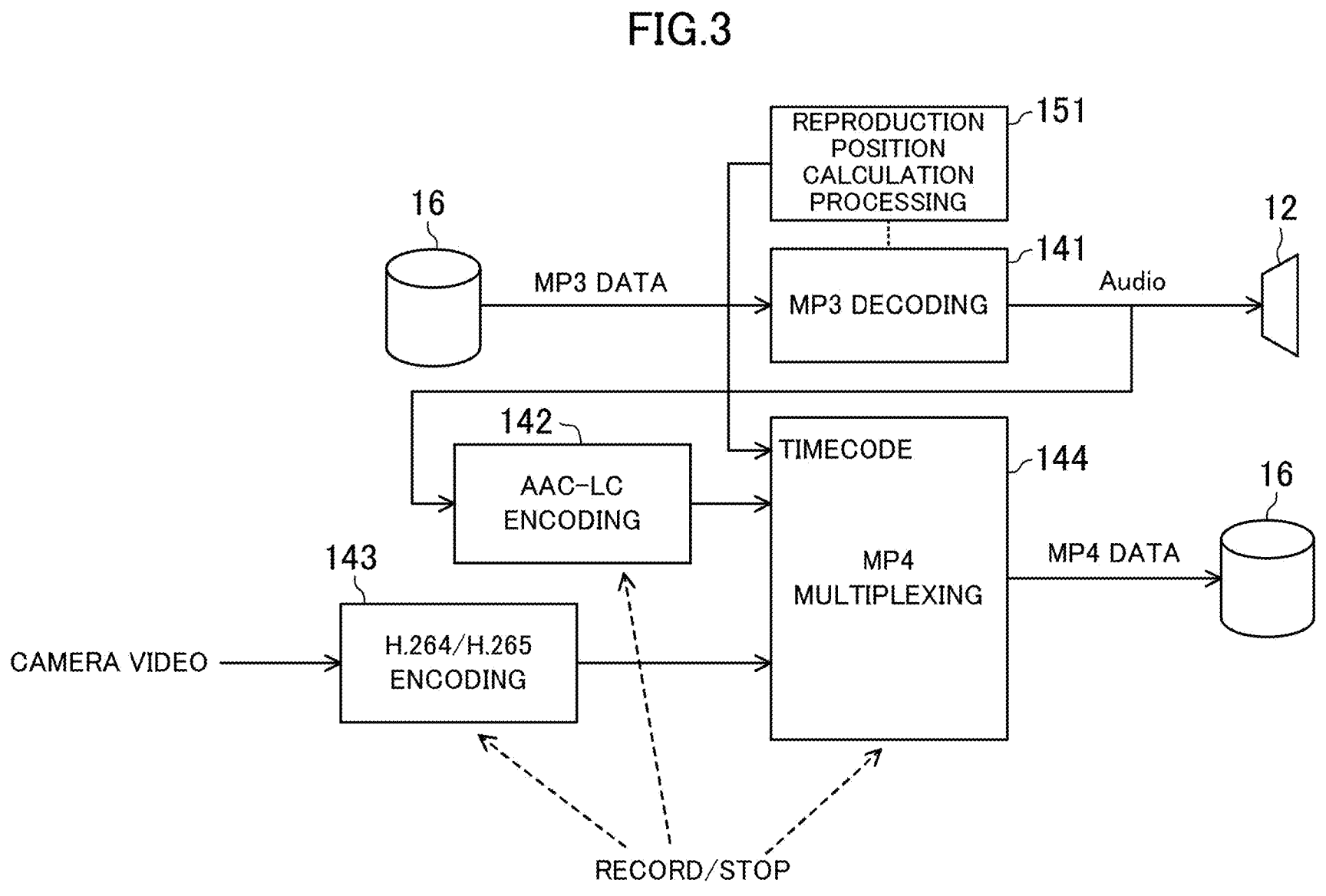

REPRODUCTION POSITION CALCULATION PROCESSING 151

MP3 DECODING 141

TIMECODE MP4 MULTIPLEXING 144

AAC-LC ENCODING 142

H.264/H.265 ENCODING 143

16

12

16

MP3 DATA

Audio

MP4 DATA

RECORD/STOP

CAMERA VIDEO

Figure 4:
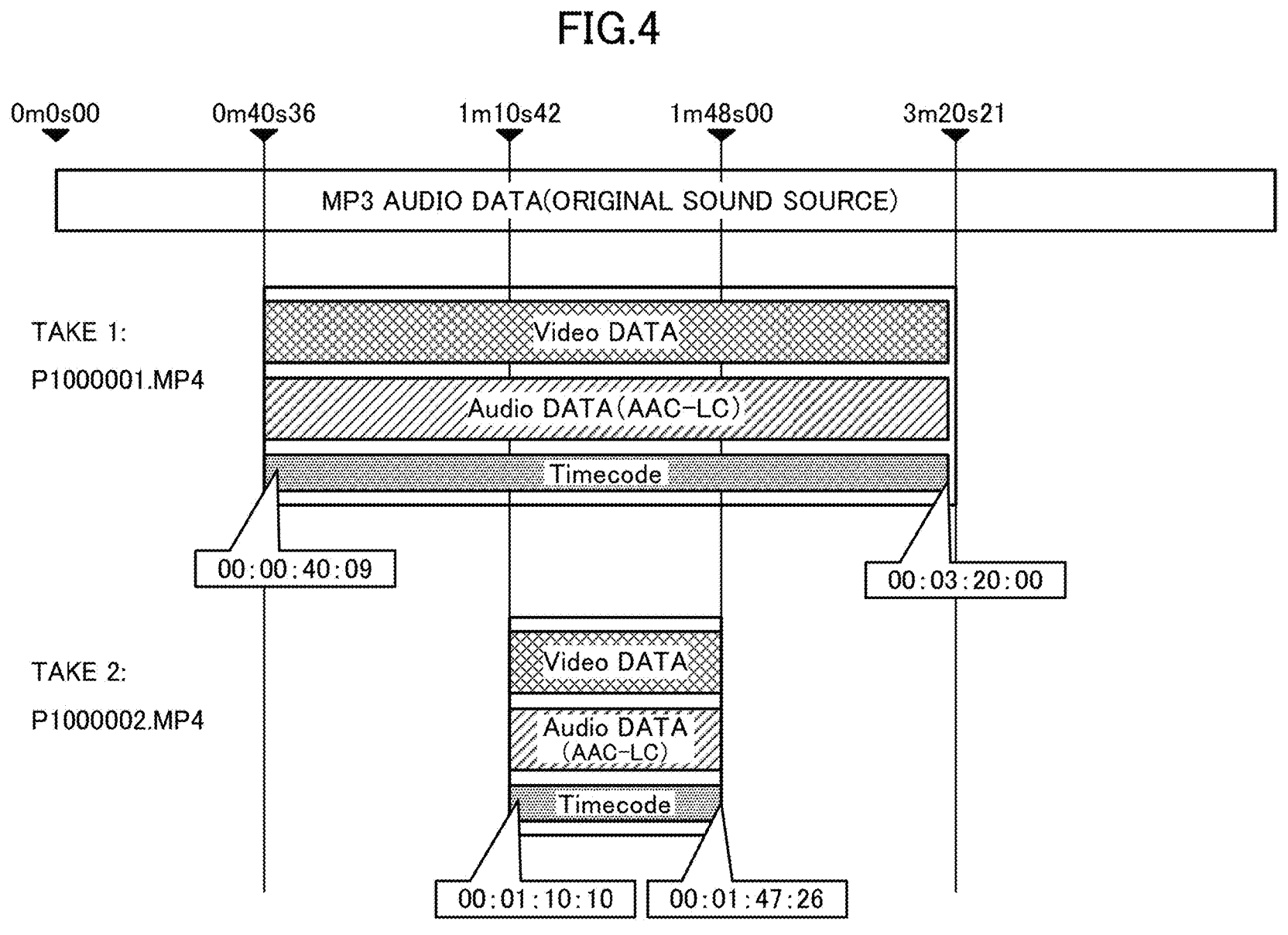

MP3 AUDIO DATA(ORIGINAL SOUND SOURCE)

TAKE 1:
P1000001.MP4

Video DATA
Audio DATA (AAC-LC)
Timecode

00:00:40:09
00:03:20:00

TAKE 2:
P1000002.MP4

Video DATA
Audio DATA (AAC-LC)
Timecode

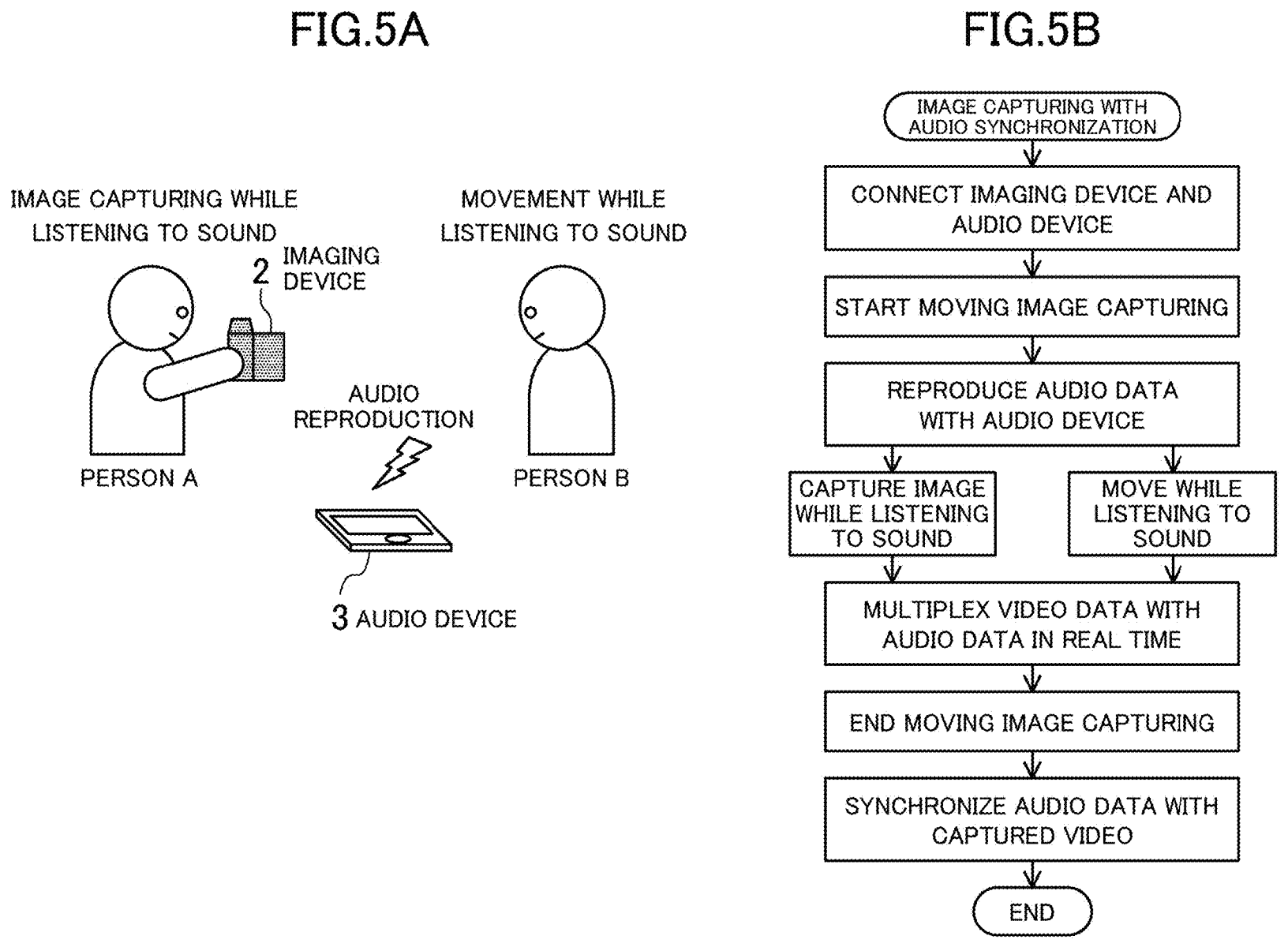

IMAGE CAPTURING WHILE LISTENING TO SOUND
2 IMAGING DEVICE
PERSON A
AUDIO REPRODUCTION
3 AUDIO DEVICE
MOVEMENT WHILE LISTENING TO SOUND
PERSON B

FIG.5B

IMAGE CAPTURING WITH AUDIO SYNCHRONIZATION
CONNECT IMAGING DEVICE AND AUDIO DEVICE
START MOVING IMAGE CAPTURING
REPRODUCE AUDIO DATA WITH AUDIO DEVICE
CAPTURE IMAGE WHILE LISTENING TO SOUND
MOVE WHILE LISTENING TO SOUND
MULTIPLEX VIDEO DATA WITH AUDIO DATA IN REAL TIME
END MOVING IMAGE CAPTURING
SYNCHRONIZE AUDIO DATA WITH CAPTURED VIDEO
END

FIG.6

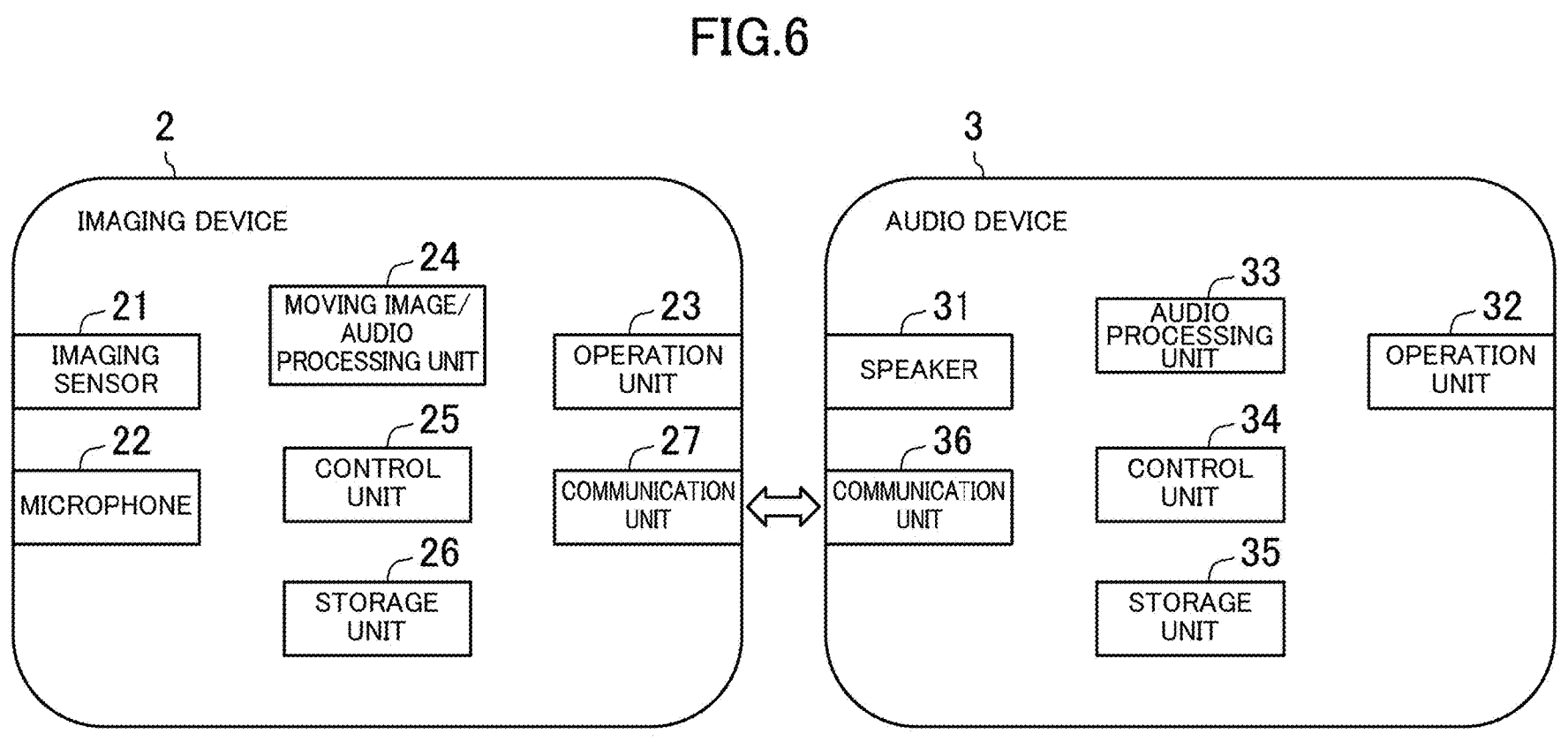

2 IMAGING DEVICE
21 IMAGING SENSOR
22 MICROPHONE
23 OPERATION UNIT
24 MOVING IMAGE/ AUDIO PROCESSING UNIT
25 CONTROL UNIT
26 STORAGE UNIT
27 COMMUNICATION UNIT

3 AUDIO DEVICE
31 SPEAKER
32 OPERATION UNIT
33 AUDIO PROCESSING UNIT
34 CONTROL UNIT
35 STORAGE UNIT
36 COMMUNICATION UNIT

AUDIO DEVICE 3
35
MP3 DATA
REPRODUCTION POSITION CALCULATION PROCESSING
341
MP3 DECODING
331
Audio
31
IMAGING DEVICE 2
26
MP3 DATA
242
H.264/H.265 ENCODING
TIMECODE
MP4 MULTIPLEXING
243
MP4 DATA
26
RECORD/STOP
CAMERA VIDEO

FIG.10

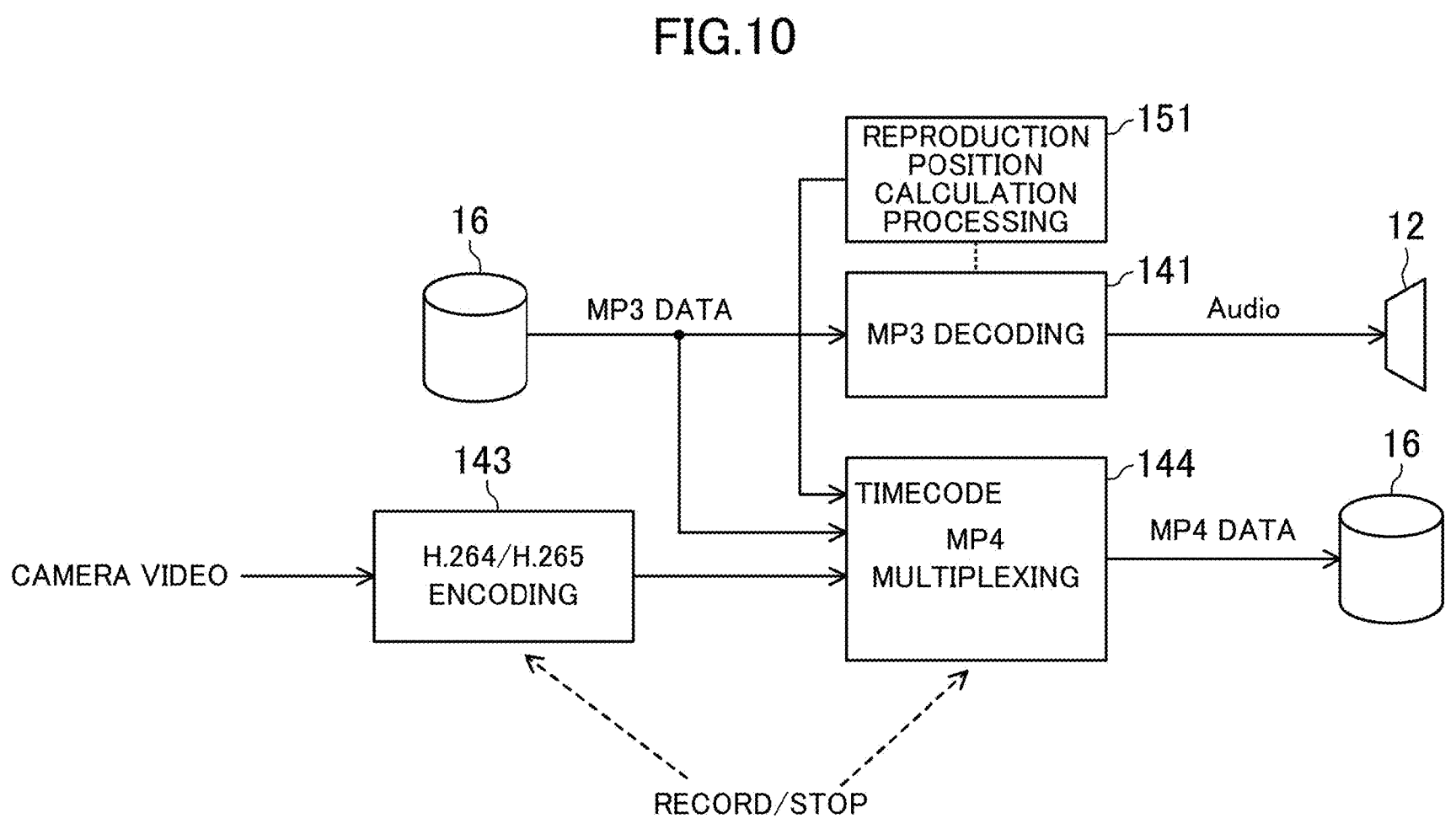

16
MP3 DATA
151
REPRODUCTION POSITION CALCULATION PROCESSING
141
MP3 DECODING
Audio
12
143
H.264/H.265 ENCODING
CAMERA VIDEO
144
TIMECODE
MP4
MULTIPLEXING
MP4 DATA
16
RECORD/STOP

IMAGING DEVICE AND IMAGING SYSTEM

CROSS-REFERENCE TO RELATED APPLICATION

This application claims priority to Japanese patent application No. 2023-142283 filed on Sep. 1, 2023, which is incorporated by reference in its entirety.

BACKGROUND

The present disclosure relates to an imaging device and an imaging system.

JP 2015-32846 A discloses a technology for enabling an imaging device to easily search for a moving image of a part corresponding to switching timing of sound in a moving image photographed in accordance with the sound. The imaging device includes: moving image photographing unit that photographs a moving image in synchronization with predetermined sound; timing information acquisition unit that acquires timing information which relates to a predetermined point of the predetermined sound and is output from an external device; and timing information storage unit that stores the acquired timing information in association with the moving image photographed by the moving image photographing unit.

SUMMARY

In a conventional imaging device or imaging system, when moving image capturing is performed while predetermined audio is reproduced, audio data to be recorded includes sound during capturing other than the predetermined audio. Therefore, there has been work for replacing audio data in moving image data with predetermined audio data after completion of capturing. The present disclosure eliminates the need for the editing step.

The present disclosure provides a technology capable of generating a moving image file in which audio and a moving image are synchronized even if moving image capturing is started from the middle of music, in an imaging device or an imaging system.

An imaging device according to the present disclosure includes: an imaging sensor; a speaker; an operation unit configured to receive an operation input related to moving image capturing and audio reproduction; a storage unit; a moving image encoder configured to encode moving image data captured by the imaging sensor, to generate moving image coded data; an audio decoder configured to decode first audio coded data stored in the storage unit, and output as audio data to the speaker; a multiplexer configured to generate a moving image file by multiplexing the moving image coded data and the first audio coded data or second audio coded data obtained by re-encoding the audio data; and a control unit configured to control an operation of the imaging device, in which the control unit causes the audio decoder to execute an operation, performs processing of calculating a reproduction position in the first audio coded data, and sends calculated reproduction position data to the multiplexer, upon receiving an operation input for audio reproduction execution via the operation unit, and causes the moving image encoder and the multiplexer to execute an operation upon receiving an operation input for moving image capturing execution via the operation unit, and the multiplexer multiplexes the reproduction position data to the moving image coded data and the first or second audio coded data, to generate a moving image file.

The imaging device according to the present disclosure can generate a moving image file in which audio and a moving image are synchronized with each other even when moving image capturing is started from the middle of music.

BRIEF DESCRIPTION OF THE DRAWINGS

FIG. 1A is a situation according to a first embodiment, and FIG. 1B is a flowchart illustrating an operation in the situation of FIG. 1A;

FIG. 3 is a main configuration example of the imaging device according to the first embodiment;

FIG. 4 is an image diagram of a moving image file to be recorded;

FIG. 5A is a situation according to a second embodiment, and FIG. 5B is a flowchart illustrating an operation in the situation of FIG. 5A;

FIG. 6 is a schematic configuration of an imaging system according to the second embodiment;

FIG. 10 is a configuration example of an imaging device according to another embodiment.

DETAILED DESCRIPTION

Hereinafter, embodiments will be described in detail with reference to the drawings as appropriate. However, unnecessarily detailed description may be omitted. For example, a detailed description of a well-known matter and a repeated description of substantially the same configuration may be omitted. This is to avoid unnecessary redundancy of the following description and to facilitate understanding by those skilled in the art. It is to be noted that the inventor(s) provides the accompanying drawings and the following description in order to enable those skilled in the art to fully understand the present disclosure, and does not intend to limit the claimed subject matter by them.

First Embodiment

Figures 1A, 1B:
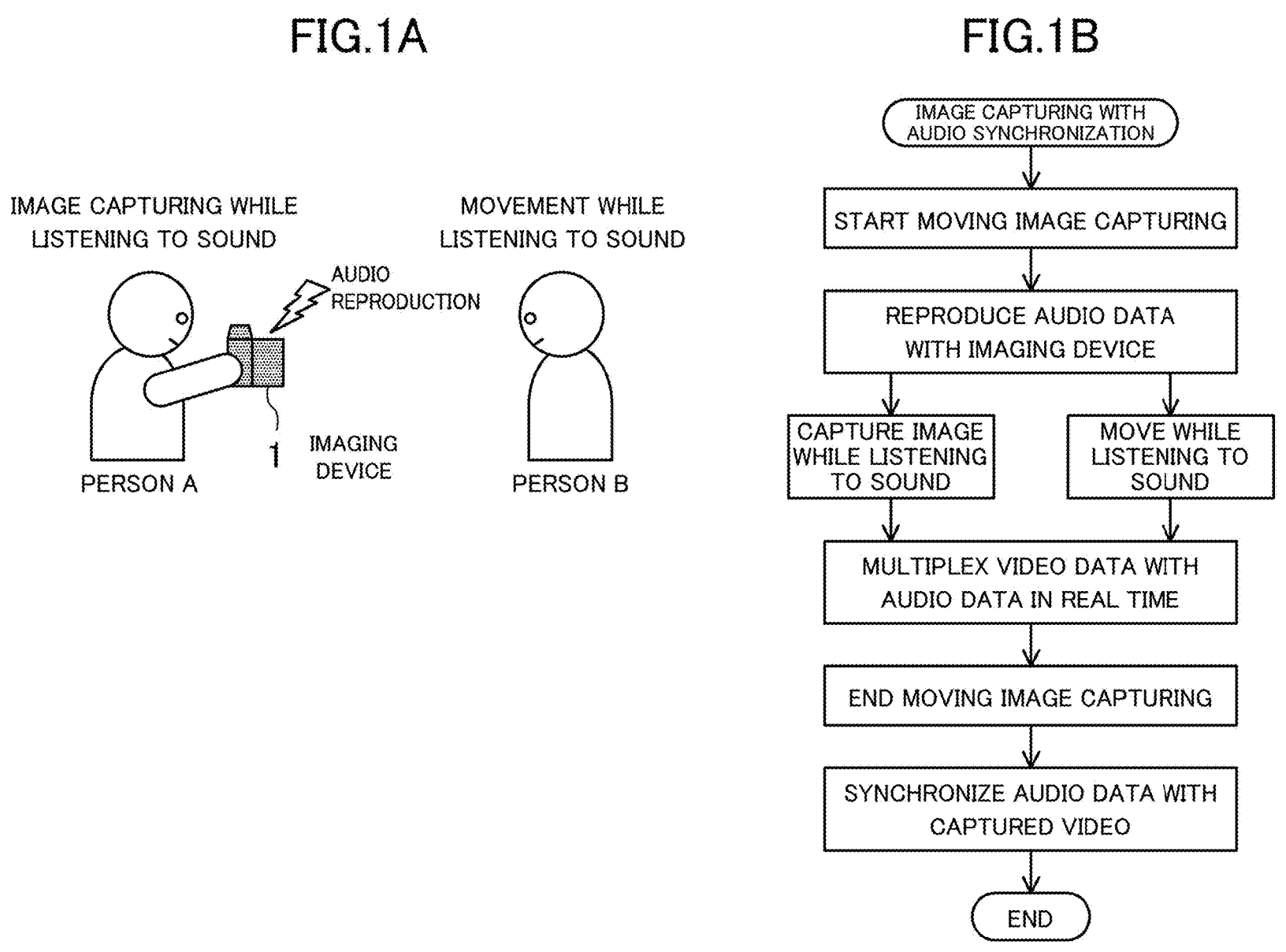

FIG. 1A illustrates a situation according to a first embodiment, and FIG. 1B illustrates an operation in the situation of FIG. 1A. In FIGS. 1A and 1B, Person A captures a moving image (for example, a dance moving image) of Person B by using an imaging device 1.

Figure 2:
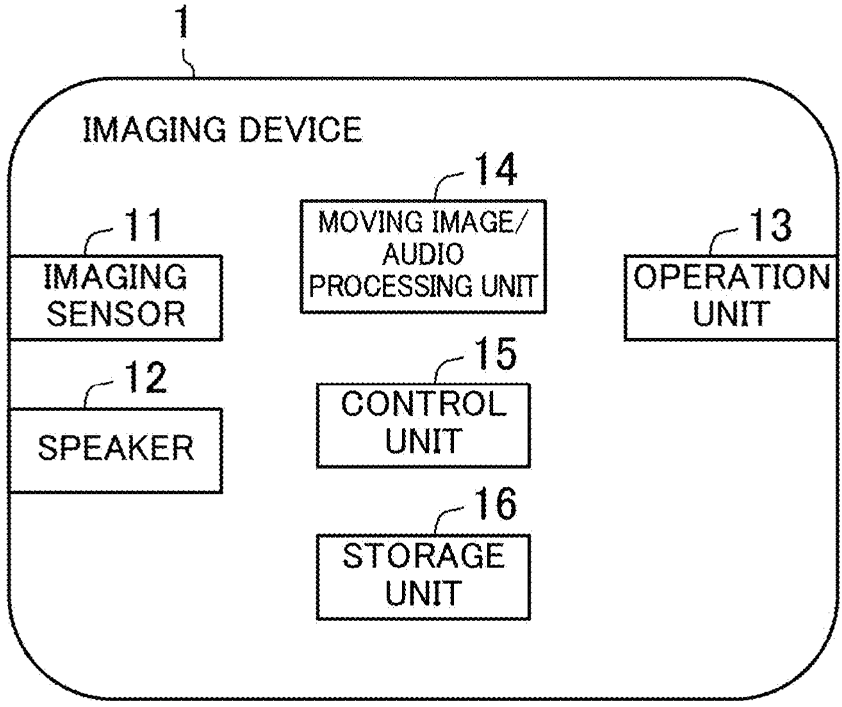
FIG. 2 is a schematic configuration of an imaging device according to the first embodiment.

As illustrated in FIG. 2, the imaging device 1 includes an imaging sensor 11, a speaker 12, an operation unit 13, a moving image/audio processing unit 14, a control unit 15, and a storage unit 16. The imaging device 1 can capture a moving image by using the imaging sensor 11, encode the captured moving image by using the moving image/audio processing unit 14 to generate a moving image file, and store the moving image file in the storage unit 16. Furthermore, the imaging device 1 can decode the audio coded data stored in the storage unit 16 by using the moving image/audio processing unit 14 and reproduce the audio data from the speaker 12. The operation unit 13 includes, for example, a button, a touch panel, or the like, and receives an operation input related to moving image capturing and audio reproduction by the user. The control unit 15 controls the operation of the imaging device 1 in accordance with an operation input via the operation unit 13.

When moving image capturing is started, Person A causes the imaging device 1 to reproduce audio data. For example, Person B performs dancing as a movement while listening to the reproduced sound, and Person A executes image capturing while listening to the reproduced sound. The imaging device 1 multiplexes the captured video data with the audio data in real time. When the moving image capturing is finished, a moving image file in which audio data is synchronized with the captured video is recorded.

FIG. 3 illustrates a main configuration example of the imaging device 1 according to the present embodiment. The moving image/audio processing unit 14 includes an MPEG-1 Audio Layer III (MP3) decoder 141, an AAC-LC encoder 142, an H.264/H.265 encoder 143, and an MPEG-4 Part 14 (MP4) multiplexer 144. Furthermore, a reproduction position calculation processing unit 151 is included in the control unit 15.

The MP3 decoder 141, which is an example of an audio decoder, decodes MP3 data, which is an example of audio coded data stored in the storage unit 16, and outputs as audio data to the speaker 12. The AAC-LC encoder 142 re-encodes the audio data output to the speaker 12 into AAC-LC data.

The H.264/H.265 encoder 143, which is an example of a moving image encoder, encodes moving image data captured by the imaging sensor 11 to generate moving image coded data. The MP4 multiplexer 144, which is an example of a multiplexer, multiplexes the moving image coded data and the AAC-LC data to generate a moving image file of MP4 data, and stores the moving image file in the storage unit 16.

Upon receiving an operation input for audio reproduction execution via the operation unit 13, the control unit 15 causes the MP3 decoder 141 to execute an operation. At this time, the reproduction position calculation processing unit 151 executes processing of calculating a reproduction position in the MP3 data. Here, for example, a time from a head of the MP3 data is converted into a timecode. For example, a timecode at a head of the MP3 data is set to 00:00:00:00, and video frame conversion is performed for a second or less. The timecode which is an example of reproduction position data is transmitted to the MP4 multiplexer 144.

Furthermore, upon receiving an operation input for moving image capturing execution via the operation unit 13, the control unit 15 causes the AAC-LC encoder 142, the H.264/H.265 encoder 143, and the MP4 multiplexer 144 to execute operations. The MP4 multiplexer 144 multiplexes the timecode to the moving image coded data and the AAC-LC data to generate a moving image file.

FIG. 4 is an image diagram of the generated moving image file. Person A captures a moving image of Person B by using the imaging device 1 while reproducing MP3 audio data as an original sound source. For example, in Take 1, the file P1000001.MP4 is generated. In the file P1000001.MP4, moving image coded data, audio coded data (AAC-LC), and a timecode are multiplexed. A head of the timecode is "00:00:40:09" corresponding to a start of moving image capturing, and an end is "00:03:20:00" corresponding to an end of moving image capturing. Similarly, in Take 2, the file P1000002.MP4 is generated. Also in the file P1000002.MP4, moving image coded data, audio coded data (AAC-LC), and a timecode are multiplexed. A head of the timecode is "00:01:10:10" corresponding to a start of moving image capturing, and an end is "00:01:47:26" corresponding to an end of moving image capturing.

As described above, according to the present embodiment, upon receiving an operation input for audio reproduction execution, the imaging device 1 causes the MP3 decoder 141 to execute an operation, decodes the MP3 data stored in the storage unit 16, and outputs audio to the speaker 12. At this time, a timecode in the MP3 data is calculated and sent to the MP4 multiplexer 144. Upon receiving an operation input for moving image capturing execution, the imaging device 1 causes the AAC-LC encoder 142, the H.264/H.265 encoder 143, and the MP4 multiplexer 144 to execute operations. The AAC-LC encoder 142 re-encodes the audio data output to the speaker 12 into AAC-LC data. The H.264/H.265 encoder 143 encodes moving image data captured by the imaging sensor 11 to generate moving image coded data. The MP4 multiplexer 144 multiplexes the timecode to the moving image coded data and AAC-LC data to generate a moving image file. As a result, for example, it is possible to generate a moving image file in which audio and a moving image are synchronized with each other even when moving image capturing is started from the middle of music. According to the imaging device 1 according to the present embodiment, even when moving image capturing is started while predetermined audio is reproduced, audio of moving image data to be recorded becomes predetermined audio data, and an editing step after capturing becomes unnecessary. At the time of editing, it is possible to easily create a moving image obtained by combining a plurality of moving image files in which audio and a moving image are synchronized.

Second Embodiment

FIG. 5A illustrates a situation according to a second embodiment, and FIG. 5B illustrates an operation in the situation of FIG. 5A. In FIGS. 5A and 5B, Person A uses an imaging device 2 to capture a moving image (for example, a dance moving image) of Person B while causing an audio device 3 as an audio reproduction device to reproduce audio. The imaging system according to the present embodiment includes the imaging device 2 and the audio device 3.

As illustrated in FIG. 6, the imaging device 2 includes an imaging sensor 21, a microphone 22, an operation unit 23, a moving image/audio processing unit 24, a control unit 25, a storage unit 26, and a communication unit 27. The imaging device 2 can capture a moving image by using the imaging sensor 21, encode the captured moving image by using the moving image/audio processing unit 24 to generate a moving image file, and store the moving image file in the storage unit 26. Furthermore, the imaging device 2 can encode audio data collected by the microphone 22 by using the moving image/audio processing unit 24, and store the coded audio data in the storage unit 26. The operation unit 23 includes, for example, a button, a touch panel, or the like, and receives an operation input related to moving image capturing by the user. The control unit 25 controls the operation of the imaging device 2 in accordance with an operation input via the operation unit 23.

The audio device 3 includes a speaker 31, an operation unit 32, an audio processing unit 33, a control unit 34, a storage unit 35, and a communication unit 36. The audio device 3 can decode audio coded data stored in the storage unit 35 by using the audio processing unit 33, and output as audio data from the speaker 31. The operation unit 32 includes, for example, a button, a touch panel, or the like, and receives an operation input related to audio reproduction by the user. The control unit 34 controls the operation of the audio device 3 in accordance with an operation input via the operation unit 32.

Before starting moving image capturing, Person A connects the imaging device 2 and the audio device 3 to enable communication. This connection may be a wireless connection such as Bluetooth (registered trademark) or a wired connection. When the moving image capturing is started, Person A causes the audio device 3 to reproduce audio data. For example, Person B performs dancing as a movement while listening to the reproduced sound, and Person A executes image capturing by using the imaging device 2 while listening to the reproduced sound. The imaging device 2 multiplexes the captured video data with the audio data in real time. When the moving image capturing is finished, a moving image file is recorded with audio data synchronized with the captured video.

Figure 7:
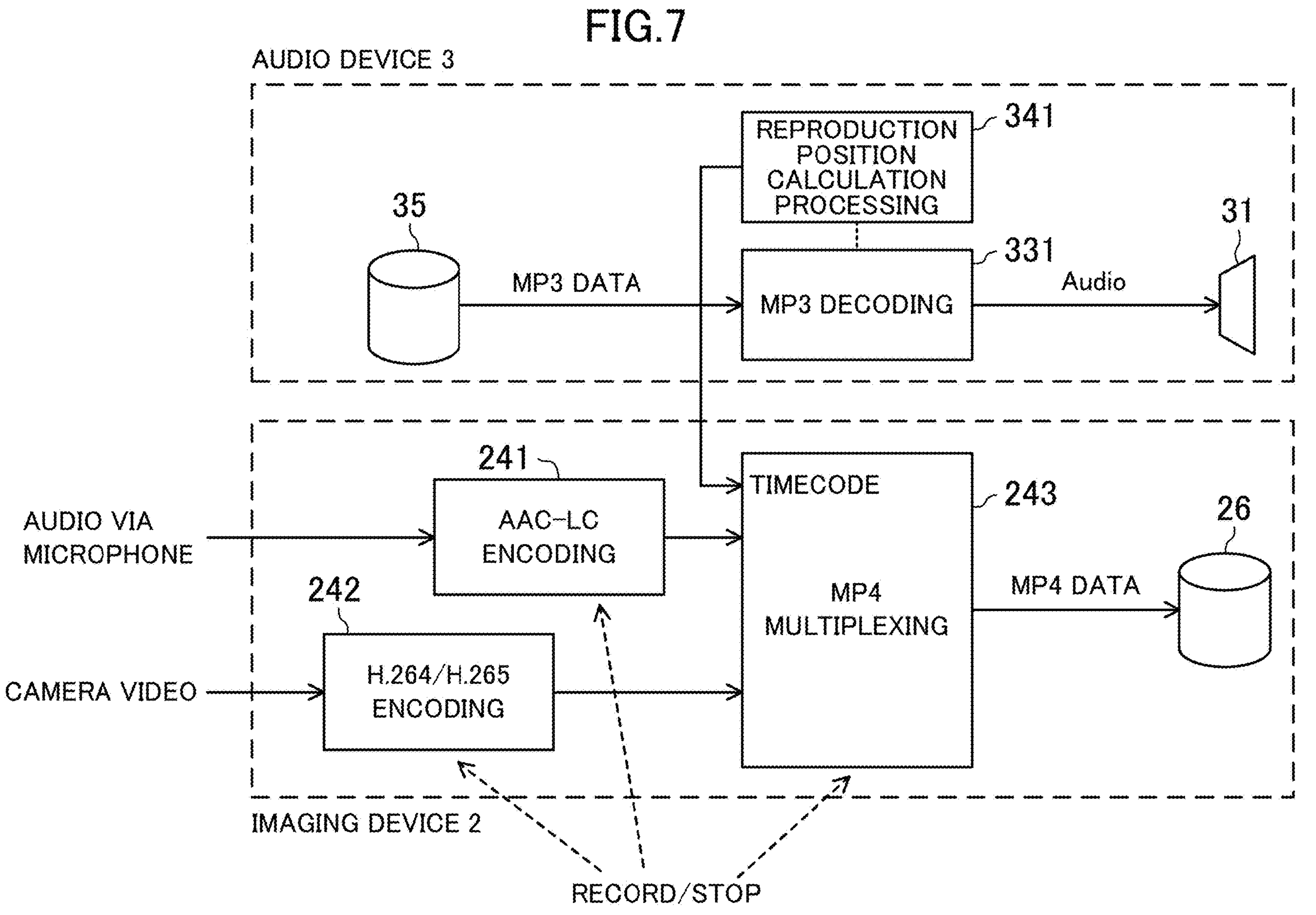
FIG. 7 is a main configuration example of the imaging system according to the second embodiment.

FIG. 7 illustrates a main configuration example of the imaging device 2 and the audio device 3 according to the present embodiment. In the imaging device 2, the moving image/audio processing unit 24 includes an AAC-LC encoder 241, an H.264/H.265 encoder 242, and an MP4 multiplexer 243. In the audio device 3, an MP3 decoder 331 is included in the audio processing unit 33. Furthermore, a reproduction position calculation processing unit 341 is included in the control unit 34.

In the audio device 3, the MP3 decoder 331, which is an example of an audio decoder, decodes MP3 data, which is an example of audio coded data stored in the storage unit 35, and output as audio data to the speaker 31.

In the imaging device 2, the AAC-LC encoder 241 encodes audio data collected by the microphone 22 into AAC-LC data. The H.264/H.265 encoder 242, which is an example of a moving image encoder, encodes moving image data captured by the imaging sensor 21 to generate moving image coded data. The MP4 multiplexer 243, which is an example of a multiplexer, multiplexes the moving image coded data and the AAC-LC data to generate a moving image file of MP4 data, and stores the moving image file in the storage unit 26.

In the audio device 3, upon receiving an operation input for audio reproduction execution via the operation unit 32, the control unit 34 causes the MP3 decoder 331 to execute an operation. At this time, the reproduction position calculation processing unit 341 executes processing of calculating a reproduction position in the MP3 data. Here, for example, a time from a head of the MP3 data is converted into a timecode. For example, a timecode at a head of the MP3 data is set to 00:00:00:00, and video frame conversion is performed for a second or less. The timecode which is an example of reproduction position data is transmitted to the MP4 multiplexer 243 of the imaging device 2.

In the imaging device 2, upon receiving an operation input for moving image capturing execution via the operation unit 23, the control unit 25 causes the AAC-LC encoder 241, the H.264/H.265 encoder 242, and the MP4 multiplexer 243 to execute operations. The MP4 multiplexer 243 multiplexes the timecode to the moving image coded data and the AAC-LC data to generate a moving image file. As a result, similarly to the first embodiment, a moving image file as illustrated in FIG. 4 is generated.

According to the present embodiment, upon receiving an operation input for audio reproduction execution, the audio device 3 causes the MP3 decoder 331 to execute an operation, decodes the MP3 data stored in the storage unit 35, and outputs audio to the speaker 31. At this time, a timecode in the MP3 data is calculated and sent to the MP4 multiplexer 243 of the imaging device 2. Upon receiving an operation input for moving image capturing execution, the imaging device 2 causes the AAC-LC encoder 241, the H.264/H.265 encoder 242, and the MP4 multiplexer 243 to execute operations. The AAC-LC encoder 241 re-encodes the audio data input via the microphone 22 into AAC-LC data. The H.264/H.265 encoder 242 encodes moving image data captured by the imaging sensor 21 to generate moving image coded data. The MP4 multiplexer 243 multiplexes the timecode to the moving image coded data and the AAC-LC data to generate a moving image file. As a result, for example, it is possible to generate a moving image file in which audio and a moving image are synchronized with each other even when moving image capturing is started from the middle of music.

Figure 8:
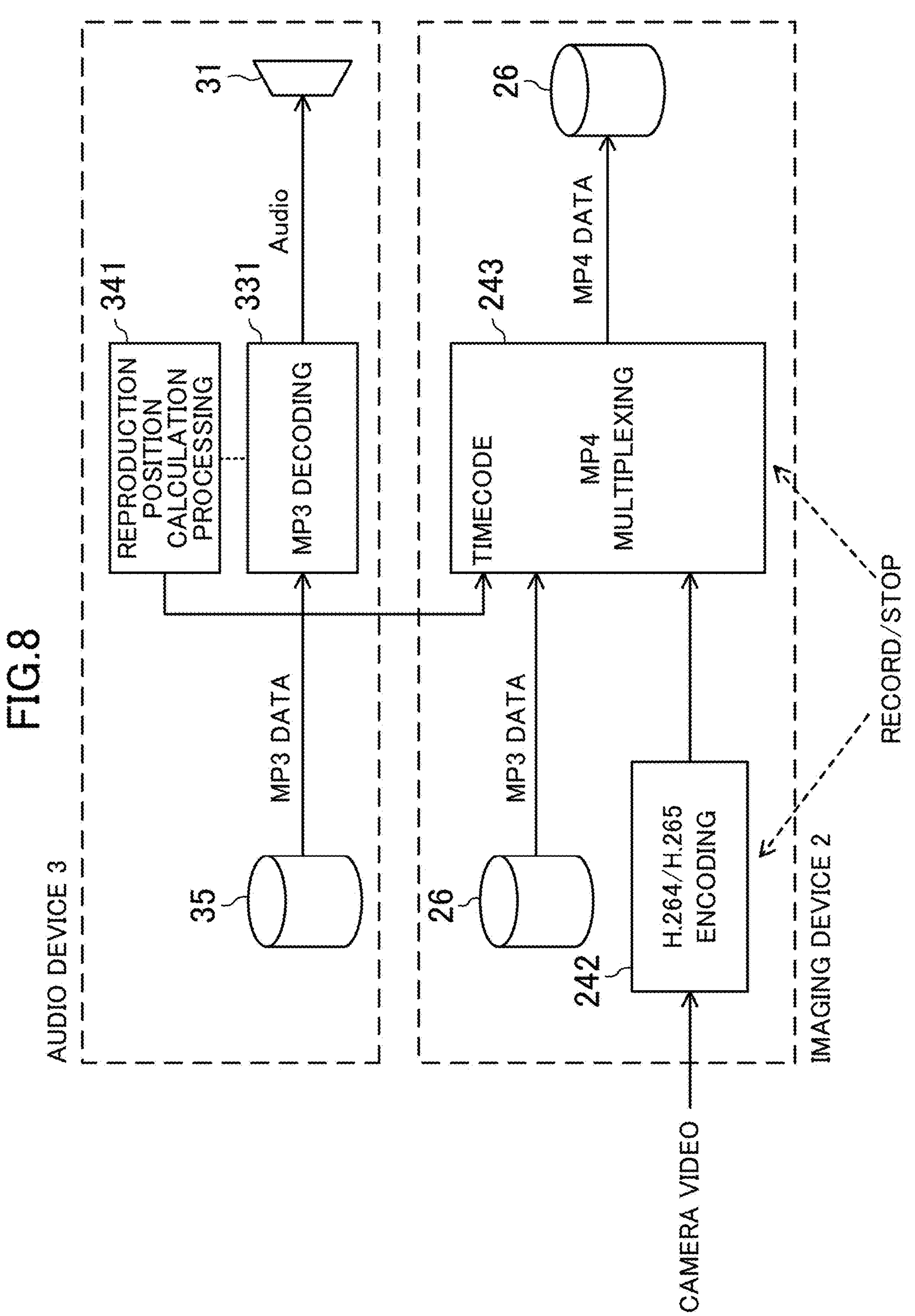
FIG. 8 is a main configuration example of an imaging system according to a modification of the second embodiment.
Figure 9:
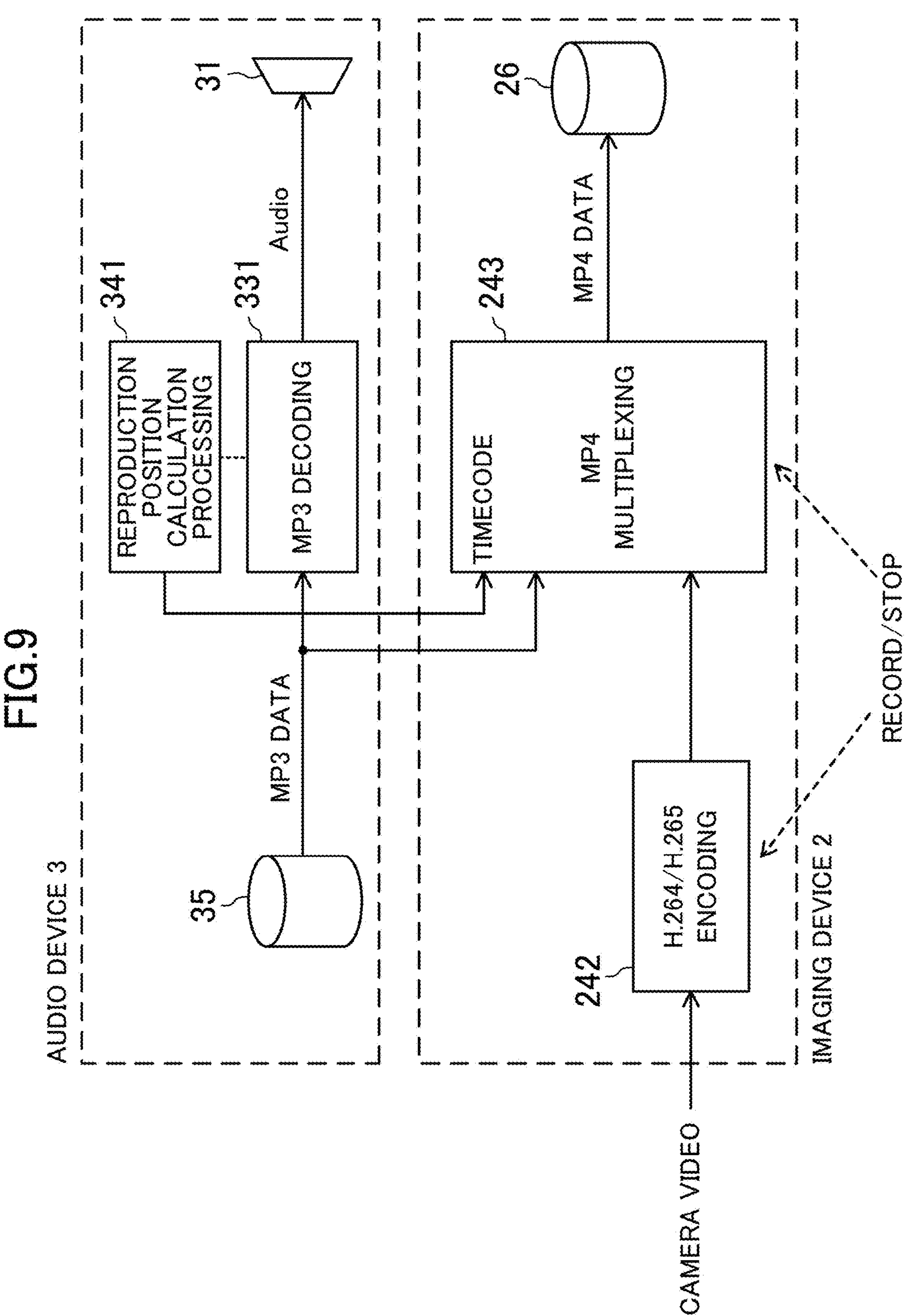
FIG. 9 is a main configuration example of an imaging system according to a modification of the second embodiment.

FIGS. 8 and 9 illustrate main configuration examples of an imaging device 2 and an audio device 3 according to a modification of the present embodiment. In the configuration of FIG. 7, since the imaging device 2 inputs audio via the microphone 22, audio data becomes an analog input, and sound quality is poor. The modification illustrated in FIGS. 8 and 9 improves this point.

In the configuration example of FIG. 8, the imaging device 2 stores, in the storage unit 26, MP3 data identical to the MP3 data stored in the storage unit 35 by the audio device 3. The imaging device 2 reads the MP3 data stored in the storage unit 26 in accordance with the received timecode. The MP4 multiplexer 243 multiplexes the moving image coded data and the MP3 data with the timecode to generate a moving image file.

In the configuration example of FIG. 9, the MP3 data stored in the storage unit 35 by the audio device 3 is transmitted to the imaging device 2 through, for example, Wi-Fi, Bluetooth, or the like. The imaging device 2 receives the MP3 data. The MP4 multiplexer 243 multiplexes the moving image coded data and the MP3 data with the timecode to generate a moving image file. These modification can improve the sound quality of the audio data included in the moving image file.

Other Embodiments

As described above, the above embodiments have been described as examples of the technology disclosed in the present application. However, the technology in the present disclosure is not limited thereto, and can also be applied to embodiments in which changes, replacements, additions, omissions, and the like are made as appropriate. In addition, it is also possible to make a new embodiment by combining components described in the above-described embodiments.

In the embodiments described above, reproduced audio data is re-encoded into AAC-LC data and multiplexed to a moving image file, but instead of this, for example, MP3 data may be multiplexed to a moving image file.

FIG. 10 illustrates another configuration example of the main part of the imaging device 1. In FIG. 10, the AAC-LC encoder 142 in the configuration of FIG. 3 is omitted, and MP3 data stored in the storage unit 16 is decoded by the MP3 decoder 141 and sent to the MP4 multiplexer 144. The MP4 multiplexer 144 multiplexes the moving image coded data and the MP3 data with the timecode to generate a moving image file.

Functions implemented by components described herein may be implemented in circuitry or processing circuitry, including a general purpose processor, an application specific processor, an integrated circuit, application specific integrated circuits (ASICs), a central processing unit (CPU), a conventional circuit, and/or a combination thereof programmed to implement the described functions. A processor includes a transistor and other circuits, and is regarded as the circuitry or the processing circuitry. The processor may be a programmed processor that executes a program stored in a memory.

In this specification, circuitry, a unit, and an instrument are hardware programmed to implement the described functions or hardware executing the functions. The hardware may be any hardware disclosed herein or any hardware programmed to execute the described functions or known to execute the described functions.

In a case where the hardware is a processor regarded as a type of circuitry, the circuitry, an instrument, or a unit is a combination of hardware and software used to configure the hardware and/or the processor.

As described above, the embodiments have been described as examples of the technology in the present disclosure. For this purpose, the accompanying drawings and the detailed description have been provided.

Accordingly, some of the components described in the accompanying drawings and the detailed description may also include components that are not indispensable for solving the problem in order to exemplify the above technology in addition to indispensable components for solving the problem. Therefore, these components that are not indispensable are not to be immediately recognized to be indispensable on the basis of the fact that these components that are not indispensable are described in the accompanying drawings or detailed description.

In addition, since the above-described embodiments are intended to exemplify the technology in the present disclosure, various changes, replacements, additions, omissions, and the like can be made within the scope of the claims or equivalents thereof.

The present disclosure is applicable to an imaging device that performs imaging in accordance with audio.

What is claimed is:

1. An imaging device comprising:

an imaging sensor;

a speaker;

an operation unit configured to receive an operation input related to moving image capturing and audio reproduction;

a storage unit;

a moving image encoder configured to encode moving image data captured by the imaging sensor, to generate moving image coded data;

an audio decoder configured to decode first audio coded data stored in the storage unit, and output as audio data to the speaker;

a multiplexer configured to generate a moving image file by multiplexing the moving image coded data and the first audio coded data or second audio coded data obtained by re-encoding the audio data; and a control unit configured to control an operation of the imaging device, wherein the control unit causes the audio decoder to execute an operation, performs processing of calculating a reproduction position in the first audio coded data, and sends calculated reproduction position data to the multiplexer, upon receiving an operation input for audio reproduction execution via the operation unit, and causes the moving image encoder and the multiplexer to execute an operation upon receiving an operation input for moving image capturing execution via the operation unit, and the multiplexer multiplexes the reproduction position data to the moving image coded data and the first or second audio coded data, to generate a moving image file.

2. An imaging system including an audio reproduction device and an imaging device, the audio reproduction device comprising:

a speaker;

a first operation unit configured to receive an operation input related to audio reproduction;

a first storage unit;

an audio decoder configured to decode first audio coded data stored in the first storage unit, and output as audio data to the speaker; and a first control unit configured to control an operation of the audio reproduction device, the imaging device comprising:

an imaging sensor;

a second operation unit configured to receive an operation input related to moving image capturing;

a second storage unit;

a moving image encoder configured to encode moving image data captured by the imaging sensor, to generate moving image coded data;

a multiplexer configured to generate a moving image file by multiplexing the moving image coded data and second audio coded data corresponding to the first audio coded data, and store the moving image file in the second storage unit; and a second control unit configured to control an operation of the imaging device, wherein the first control unit in the audio reproduction device causes the audio decoder to execute an operation, performs processing of calculating a reproduction position in the first audio coded data, and sends calculated reproduction position data to the imaging device, upon receiving an operation input for audio reproduction execution via the first operation unit, and the second control unit in the imaging device causes the moving image encoder and the multiplexer to execute an operation upon receiving an operation input for moving image capturing execution via the second operation unit, and the multiplexer multiplexes the reproduction position data sent from the audio reproduction device to the moving image coded data and the second audio coded data, to generate a moving image file.

3. The imaging system according to claim 2, wherein the imaging device comprises:

a microphone; and an audio encoder configured to encode audio data collected by the microphone, to generate the second audio coded data.

4. The imaging system according to claim 2, wherein the imaging device stores data identical to the first audio coded data in the second storage unit, as the second audio coded data.

5. The imaging system according to claim 2, wherein the first audio coded data is transmitted as the second audio coded data from the audio reproduction device to the imaging device.

* * * * *